US012699244B2

(12) United States Patent
Taki et al.

(10) Patent No.: US 12,699,244 B2
(45) Date of Patent: Aug. 4, 2026

(54) STORAGE UNIT AND WOUND BODY

(71) Applicant: FUJIKURA LTD., Tokyo (JP)

(72) Inventors: Go Taki, Chiba (JP); Shengyang Luo, Chiba (JP); Masayuki Ishioka, Chiba (JP); Minoru Takahashi, Chiba (JP)

(73) Assignee: Fujikura Ltd., Tokyo (JP)

( * ) Notice: Subject to any disclaimer, the term of this patent is extended or adjusted under 35 U.S.C. 154(b) by 285 days.

(21) Appl. No.: 18/574,408

(22) PCT Filed: Feb. 21, 2022

(86) PCT No.: PCT/JP2022/006946
§ 371 (c)(1),
(2) Date: Dec. 27, 2023

(87) PCT Pub. No.: WO2023/276258
PCT Pub. Date: Jan. 5, 2023

(65) Prior Publication Data
US 2024/0302618 A1     Sep. 12, 2024

(30) Foreign Application Priority Data

Jun. 30, 2021     (JP) ................................. 2021-108562

(51) Int. Cl.
G02B 6/44          (2006.01)
(52) U.S. Cl.
CPC .................................. G02B 6/4457 (2013.01)
(58) Field of Classification Search
CPC .................................................. G02B 6/4457

(Continued)

(56) References Cited

U.S. PATENT DOCUMENTS 6,484,958 B1     11/2002  Xue et al.

FOREIGN PATENT DOCUMENTS

CN          210418737 U      4/2020
JP          H01-153551 A      6/1989
(Continued)

OTHER PUBLICATIONS

International Search Report issued in corresponding International Application No. PCT/JP2022/006946 mailed Apr. 26, 2022 (4 pages).

(Continued)

*Primary Examiner* — Jerry M Blevins
(74) *Attorney, Agent, or Firm* — Osha Bergman Watanabe & Burton LLP

(57)                ABSTRACT

A storage unit includes a wound body made of wound linear material and a storage body that stores the wound body. The wound body includes a first spiral part in which the wound linear material is spirally wound in a first winding direction such that a distance between the wound linear material of the first spiral part and a center of the wound body gradually decreases, a first inversion part, disposed inside the first spiral part, that inverts a winding direction of the wound linear material from the first winding direction to a second winding direction opposite to the first winding direction, and a second spiral part, disposed outside the first inversion part, in which the wound linear material is spirally wound in the second winding direction such that a distance between the wound linear material of the second spiral part and the center gradually increases.

14 Claims, 8 Drawing Sheets

(58) Field of Classification Search
    USPC .......................................................... 385/135
    See application file for complete search history.

(56)                       References Cited

FOREIGN PATENT DOCUMENTS

| JP | H01260403 A | 10/1989 | |
|----|-------------|---------|---|
| JP | 2001-335240 A | 12/2001 | |
| JP | 2002-22971 A | 1/2002 | |
| JP | 2003-329851 A | 11/2003 | |
| JP | 2010-256507 A | 11/2010 | |
| JP | 2013-184795 A | 9/2013 | |
| JP | 2017-193396 A | 10/2017 | |
| TW | 201532932 A | 9/2015 | |
| WO | 2006010326 A1 | 2/2006 | |
| WO | WO-2019199938 A1 * | 10/2019 | ............. B65H 75/36 |

OTHER PUBLICATIONS

Office Action issued in the counterpart Taiwanese Patent Application No. 111107471, mailed May 30, 2023 (11 pages).

* cited by examiner

STORAGE UNIT AND WOUND BODY

CROSS-REFERENCE TO RELATED APPLICATIONS

The present application claims priority to Japanese Patent Application No. 2021-108562, filed Jun. 30, 2021. The contents of this application are incorporated herein by reference in their entirety.

BACKGROUND

Technical Field

The present invention relates to a storage unit and a wound body.

Description of the Related Art

At the time of paying out an optical cable from a drum on which the optical cable is wound, the optical cable may get twisted if the optical cable is simply paid out linearly without rotating the drum. To address this, there are techniques for storing the optical cable in a figure eight. PTL 1 discloses an optical cable winding method with which the cable's wound shape can be prevented from shifting and collapsing.

Patent Literature

PTL 1: Japanese Patent Publication No. 2013-184795

In cases where a linear material (such as an optical cable) is wound in a figure eight and the wound layers are simply stacked, the intersection points of the linear material will overlap one another in the stacking direction, which will impair storage volumetric efficiency. Even when a linear material is stored according to the winding method disclosed in PTL 1, the intersection points of the linear material will overlap one another in the stacking direction, thus impairing storage volumetric efficiency.

SUMMARY

One or more embodiments can improve storage volumetric efficiency of a linear material.

A storage unit according to one or more embodiments includes: a wound body formed by winding a linear material; and a storage body configured to store the wound body. The wound body includes: a first spiral part wherein the linear material is wound in a plurality of turns in a first direction which is either clockwise or counterclockwise, and the distance between the linear material of the first spiral part and the center decreases as the linear material is spirally wound (i.e., gradually decreases); a first inversion part located inside the first spiral part, and configured to invert a winding direction of the linear material from the first direction to a second direction which is opposite to the first direction; and a second spiral part located outside the first inversion part, wherein the linear material is wound in a plurality of turns in the second direction, and the distance between the linear material of the second spiral part and the center increases as the linear material is spirally wound (i.e., gradually increases).

Other features of one or more embodiments will become apparent from the following description of the present Specification and Drawings.

One or more embodiments can improve storage volumetric efficiency of a linear material.

DESCRIPTION OF THE EMBODIMENTS

Figure 1:
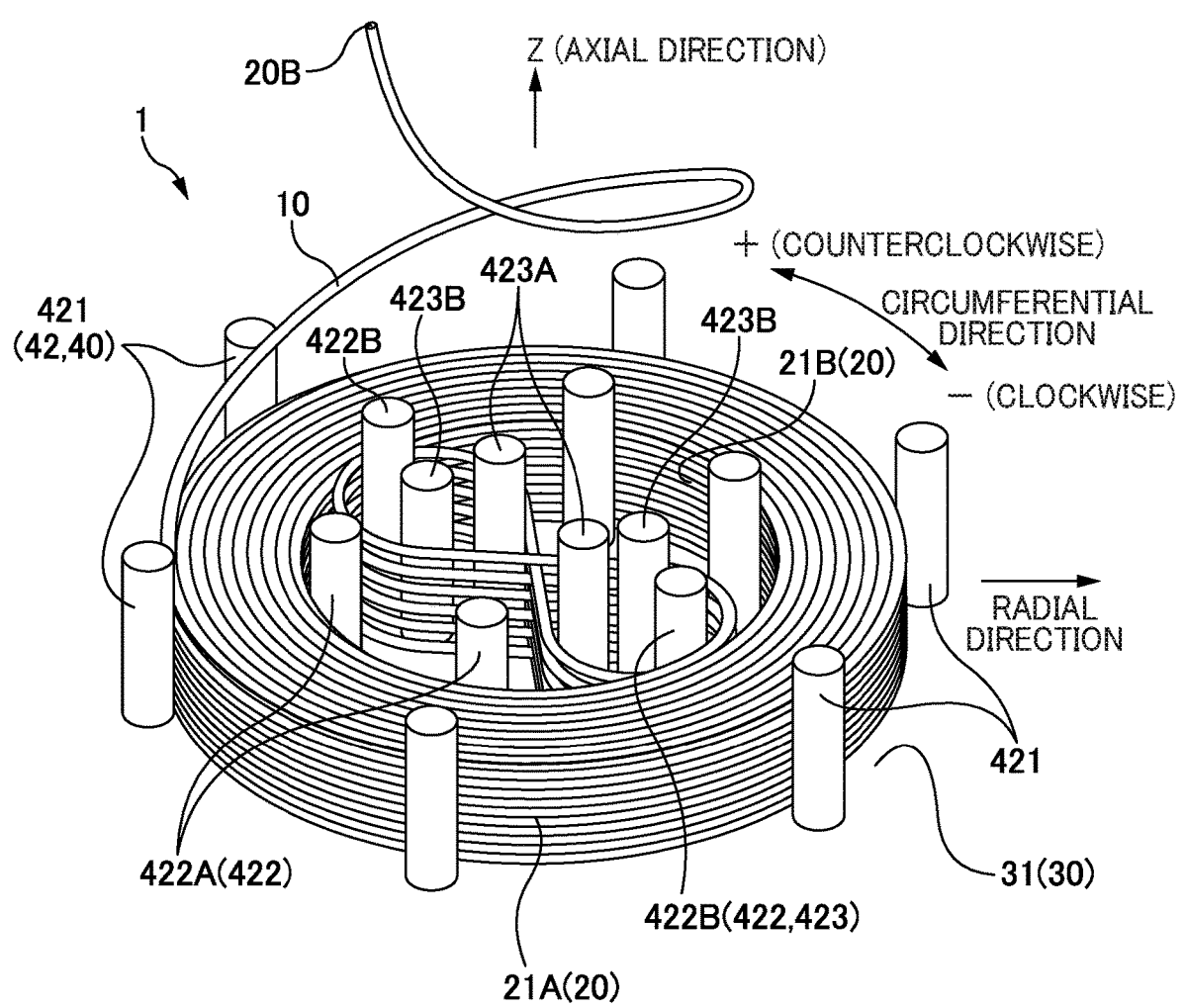
FIG. 1 is an explanatory diagram of a storage unit according to one or more embodiments.

At least the following features are disclosed in the Specification and Drawings as described below.

Disclosed is a storage unit including: a wound body formed by winding a linear material; and a storage body configured to store the wound body, wherein the wound body includes: a first spiral part wherein the linear material is wound in a plurality of turns in a first direction which is either clockwise or counterclockwise, and the distance between the linear material of the first spiral part and the center decreases as the linear material is spirally wound; a first inversion part located inside the first spiral part, and configured to invert a winding direction of the linear material from the first direction to a second direction which is opposite to the first direction; and a second spiral part located outside the first inversion part, wherein the linear material is wound in a plurality of turns in the second direction, and the distance between the linear material of the second spiral part and the center increases as the linear material is spirally wound. With this storage unit, it is possible to improve the storage volumetric efficiency of the linear material.

It is preferable that at least a portion of the linear material constituting the second spiral part is located in a space between the linear material constituting the first spiral part. In this way, it is possible to improve the storage volumetric efficiency of the linear material. In addition, it is preferable that the linear material constituting the first spiral part is disposed with intervals therebetween in the radial direction. By disposing the linear material constituting the first spiral part with intervals therebetween in the radial direction and also locating at least a portion of the linear material constituting the second spiral part in a space between the linear material constituting the first spiral part, it is possible to both improve storage volumetric efficiency and suppress twisting accumulated in the linear material when the linear material is drawn out.

It is preferable that the linear material constituting the first spiral part and the linear material constituting the second spiral part are in contact with one another. It is possible to further improve the storage volumetric efficiency of the linear material.

It is preferable that the wound body further includes: a third spiral the material part wherein linear extends continuously from the second spiral part and is wound in a plurality of turns in the second direction, and the distance between the linear material of the third spiral part and the center decreases as the linear material is spirally wound; a second inversion part located inside the third spiral part, and configured to invert the winding direction of the linear material from the second direction to the first direction; and a fourth spiral part located outside the second inversion part, wherein the linear material is wound in a plurality of turns in the first direction, and the distance between the linear material of the fourth spiral part and the center increases as the linear material is spirally wound. In this way, it is possible to improve the storage volumetric efficiency of the linear material.

It is preferable that a layer constituted by the first spiral part and the second spiral part and a layer constituted by the third spiral part and the fourth spiral part are stacked. In this way, it is possible to improve the storage volumetric efficiency of the linear material.

It is preferable that the layer constituted by the first spiral part and the second spiral part and the layer constituted by the third spiral part and the fourth spiral part are stacked alternately and repeatedly. In this way, it is possible to improve the storage volumetric efficiency of the linear material.

It is preferable that the linear material in the layer constituted by the first spiral part and the second spiral part and the linear material in the layer constituted by the third spiral part and the fourth spiral part are in contact with one another in a stacking direction. In this way, it is possible to improve the storage volumetric efficiency of the linear material.

It is preferable that the storage body includes an outer periphery holding part configured to hold an outer periphery of a spirally-wound part constituted by the linear material wound outside the first inversion part and the second inversion part. In this way, it is possible to suppress the linear material in the spirally-wound part from collapsing.

It is preferable that the storage body further includes an inner periphery holding part configured to hold an inner periphery of the spirally-wound part. In this way, it is possible to suppress the linear material in the spirally-wound part from collapsing inward.

It is preferable that the storage body further includes an inversion holding part configured to hold the first inversion part and the second inversion part. In this way, it is possible to suppress the linear material in the inversion part from collapsing.

It is preferable that the flexural rigidity with respect to a neutral axis of the spirally-wound linear material is smaller than the flexural rigidity with respect to an axis orthogonal to the neutral axis. In this way, it is easier to retain the shape of the wound body.

Also disclosed is a wound body including: a first spiral part wherein a linear material is wound in a plurality of turns in a direction is first which either clockwise or counterclockwise, and the distance between the linear material of the first spiral part and the center decreases as the linear material is spirally wound; a first inversion part located inside the first spiral part, and configured to invert a winding direction of the linear material from the first direction to a second direction which is opposite to the first direction; and a second spiral part located outside the first inversion part, wherein the linear material is wound in a plurality of turns in the second direction, and the distance between the linear material of the second spiral part and the center increases as the linear material is spirally wound. With this wound body, it is possible to improve the storage volumetric efficiency of the linear material.

Embodiments

Figure 2A:
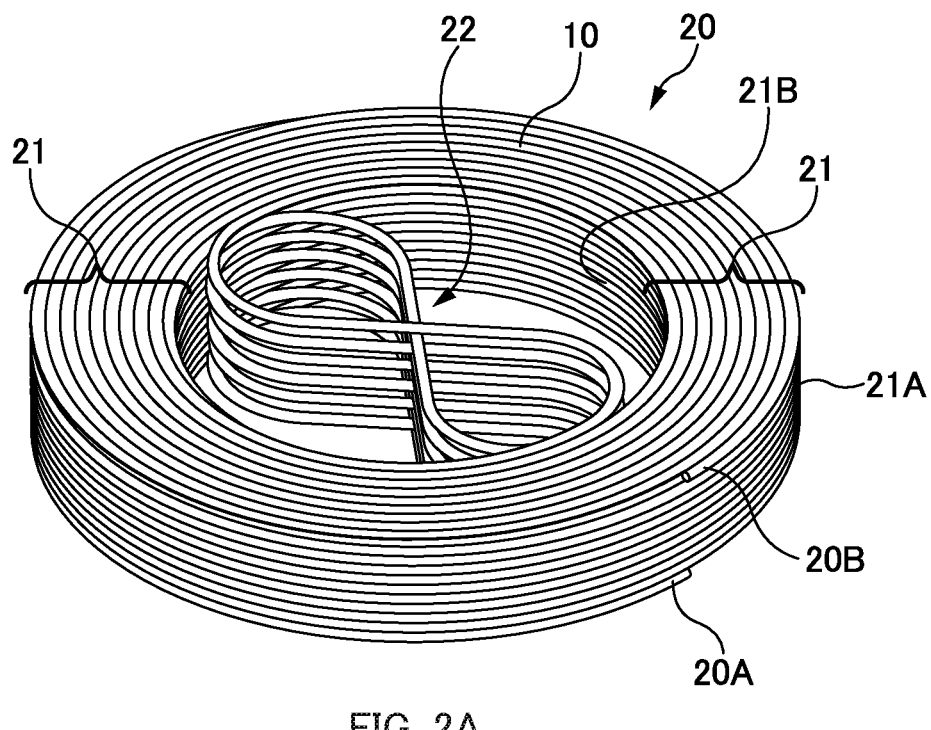
FIG. 2A is an explanatory diagram of a wound body according to one or more embodiments.
Figure 2B:
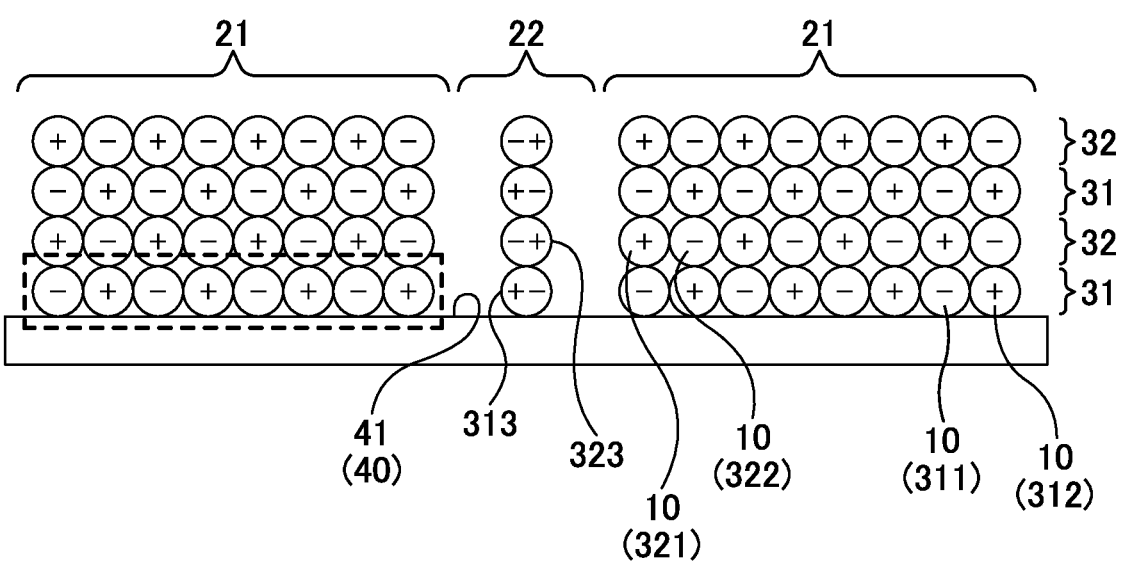
FIG. 2B is a cross-sectional explanatory diagram of the wound body according to one or more embodiments.
Figure 3:
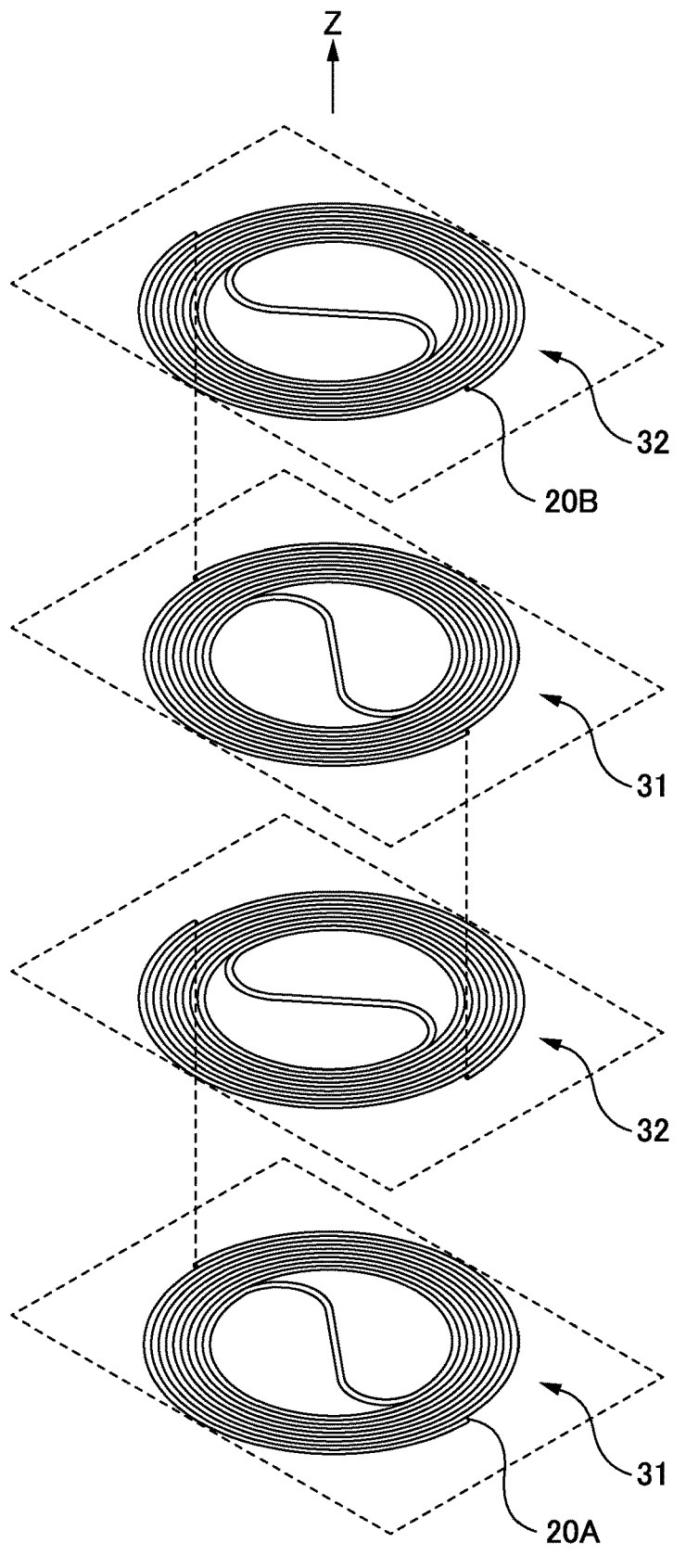
FIG. 3 is an explanatory diagram of a layered structure of the wound body according to one or more embodiments.

FIG. 1 is an explanatory diagram of a storage unit 1 according to one or more embodiments. FIG. 1 illustrates how a linear material 10 is drawn out from the storage unit 1. FIG. 2A is an explanatory diagram of a wound body 20 according to one or more embodiments. FIG. 2B is a cross-sectional explanatory diagram of the wound body 20 according to one or more embodiments. FIG. 3 is an explanatory diagram of a layered structure of the wound body 20 according to one or more embodiments.

The storage unit 1 is a member (unit) configured to store a linear material 10. The linear material 10 is a linear member. The linear material 10 may encompass, for example, linear members such as cables (electric cables, optical cables, etc.) and wires. In this example, the linear material 10 is an optical cable (described below; see FIG. 7A). The linear material 10 may be constituted by a single continuous member having no joint, or may be constituted by connecting a plurality of members. A linear material 10 with no joint is advantageous in that the linear material 10 can be stored with high density. On the other hand, in cases where a single linear material 10 is made by connecting a plurality of members, it is possible to make a long linear material 10 from short members.

The storage unit 1 includes the linear material 10 and a storage body 40 configured to store the linear material 10. In the storage unit 1, the linear material 10 is stored in a wound state. The wound linear material 10 is referred to as "wound body". So, the storage unit 1 includes the wound body 20 and the storage body 40.

In the description below, as illustrated in FIG. 1, the axial direction of the substantially circular-cylindrical wound body 20 is referred to as "Z direction". The Z direction may be referred to also as "stacking direction" or "height direction". In the Z direction, the side of the leading end 20B as viewed from the base end 20A of the linear material 10 is referred to as "plus (+) side". It should be noted that the "base end 20A" is the end part on the side where winding of the linear material 10 is started. The "leading end 20B" is the end part of the linear material 10 on the opposite side from the base end 20A. The leading end 20B is the end part (terminal end) on the side where winding of the linear material 10 is ended. When drawing out the linear material 10 from the storage unit 1, drawing is started from the leading end 20B (see FIG. 1), whereas the base end 20A is drawn out at the end.

In the description below, the direction around the axis of the substantially circular-cylindrical wound body 20 is referred to as "circumferential direction". The linear material 10 is mainly wound along the circumferential direction. As viewed from the plus side in the Z direction, the counterclockwise direction in the circumferential direction is referred to as "plus (+) side", whereas the clockwise direction is referred to as "minus (−) side". In the description below, as viewed from the plus side in the Z direction, the clockwise winding direction may be referred to as "first direction", whereas the counterclockwise winding direction may be referred to as "second direction". (Note, however, that the counterclockwise winding direction may be defined as "first direction" and the clockwise winding direction may be defined as "second direction".) In FIG. 2B, the cross section of the linear material 10 wound in the first direction is indicated by a minus (−) sign, whereas the cross section of the linear material 10 wound in the second direction is indicated by a plus (+) sign.

In the description below, the direction of the radius of the substantially circular-cylindrical wound body 20 is referred to as "radial direction". The side farther from the center of the wound body 20 in the radial direction is referred to as "plus (+) side".

In one or more embodiments, as illustrated in FIG. 1, the linear material 10 can be drawn out by pulling the linear material 10 toward the plus side in the Z direction. Such a method of drawing out (paying out) the linear material 10 may be referred to as "flyer pay-off". In one or more embodiments, the linear material 10 is stored in a manner that, when the linear material 10 is drawn out as illustrated in FIG. 1, twisting of the drawn-out linear material 10 is suppressed.

As illustrated in FIGS. 2A and 2B, the wound body 20 includes a spirally-wound part 21 and an inversion part 22.

The spirally-wound part 21 is a part wherein the linear material 10 is spirally wound round and round in the circumferential direction. The spirally-wound part 21 includes the linear material 10 wound clockwise, and the linear material 10 wound counterclockwise. As will be described below, the spirally-wound part 21 is constituted by a first spiral part 311, a second spiral part 312, a third spiral part 321, and a fourth spiral part 322 (see FIG. 4). It should be noted that, although the spirally-wound part 21 illustrated in the figure is substantially circular cylindrical, the linear material 10 may be wound such that the spirally-wound part 21 has a square pillar shape with rounded corners.

The inversion part 22 is a part wherein the linear material 10 is wound so as to invert the winding direction. As will be described below, the inversion part 22 is constituted by a first inversion part 313 and a second inversion part 323 in which the linear material 10 is wound in an S-shape or an inverted S-shape (Z-shape) (see FIG. 4).

As illustrated in FIG. 3, the wound body 20 has a layered structure in which a plurality of layers are stacked. The wound body 20 has a structure in which a first layer 31 formed by winding the linear material 10 according to a predetermined winding method and a second layer 32 formed by winding the linear material 10 according to a winding method different from that of the first layer 31 are stacked alternately. FIG. 3 illustrates each of the layers in a separated state, but actually, the linear material 10 constituting each layer is continuous with the linear material 10 in the adjacent layer in the Z direction. In FIG. 3, the linear material 10 constituting each layer is wound such that each of the layers is perpendicular to the Z direction. Note, however, that each layer does not have to be perfectly perpendicular to the Z direction. Further, a portion of the linear material 10 constituting each layer may be wound in a manner deviating in the Z direction with respect to a plane perpendicular to the Z direction.

Figure 4:
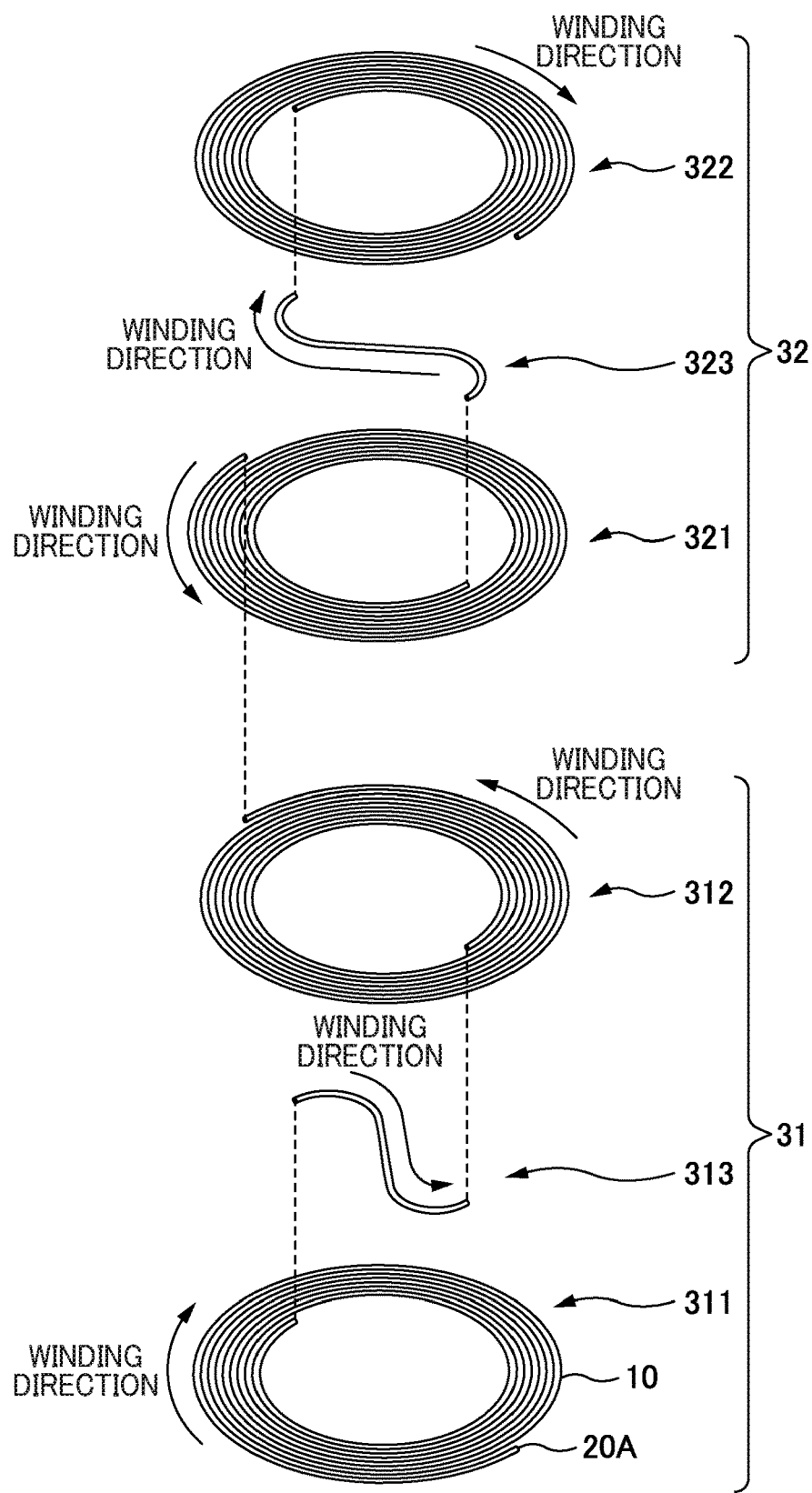
FIG. 4 is an explanatory diagram of a method for winding a linear material in a first layer and a second layer.

FIG. 4 is an explanatory diagram of a method for winding the linear material 10 in the first layer 31 and the second layer 32. FIG. 4 illustrates the linear material 10 in each part in a separated state, but actually, the linear material 10 constituting each part is continuous with the linear material 10 constituting the adjacent part.

The linear material 10 constituting the first layer 31 includes, in order from the base end side, a first spiral part 311, a first inversion part 313, and a second spiral part 312. The first layer 31 is a layer constituted by the first spiral part 311 and the second spiral part 312.

The first spiral part 311 is a part wherein the linear material 10 is spirally wound in a plurality of turns in the first direction (clockwise). In the first spiral part 311, the linear material 10 is wound in a manner that the distance between the linear material 10 and the center decreases as the linear material is spirally wound. In the first spiral part 311, the linear material 10 is spirally wound from the outer side toward the inner side. It should be noted that, when the linear material 10 is spirally wound in a plurality of turns, the length of the linear material 10 per turn on the outer side becomes longer than the length of the linear material 10 per turn on the inner side. At an end part (end part on the leading end side) on the inner side of the first spiral part 311, the linear material 10 continuously transitions from the first spiral part 311 to the first inversion part 313.

The first inversion part 313 is a part located inside the first spiral part 311 (and the second spiral part 312). In the first inversion part 313, the winding direction of the linear material 10 is inverted from the first direction (clockwise) to the second direction (counterclockwise). In this example, when the first inversion part 313 is viewed from the plus side in the Z direction, the linear material 10 is wound in an inverted S-shape. At one end (end part on the base end side) of the first inversion part 313, the linear material 10 continuously transitions from the first spiral part 311 to the first inversion part 313. At the other end (end part on the leading end side) of the first inversion part 313, the linear material 10 continuously transitions from the first inversion part 313 to the second spiral part 312.

The second spiral part 312 is a part wherein the linear material 10 is spirally wound in a plurality of turns in the second direction (counterclockwise). In the second spiral part 312, the linear material 10 is wound in a manner that the distance between the linear material 10 and the center increases as the linear material is spirally wound. In the second spiral part 312, the linear material 10 is spirally wound from the inner side toward the outer side. At an end part (end part on the base end side) on the inner side of the second spiral part 312, the linear material 10 continuously transitions from the first inversion part 313 to the second spiral part 312. It should be noted that, at an end part (end part on the leading end side) on the outer side of the second spiral part 312, the linear material 10 continuously transitions from the second spiral part 312 to the third spiral part 321. Stated differently, the linear material 10 continuously transitions between the first layer 31 and the second layer 32 (i.e., the second layer 32 adjacent on the plus side in the Z direction).

When the linear material 10 of the first layer 31 is drawn out in the Z direction, the linear material 10 constituting the second spiral part 312 is drawn out first. In the second spiral part 312, the linear material 10 is wound along the second direction, and therefore, when the linear material 10 of the second spiral part 312 is drawn out, the drawn-out linear material 10 will be twisted in a predetermined direction. After the linear material 10 of the second spiral part 312 is drawn out, the linear material 10 of the first inversion part 313 and the first spiral part 311 will be drawn out. In the first spiral part 311, the linear material 10 is wound along a direction (first direction) opposite from the second spiral part 312, and therefore, when the linear material 10 of the first spiral part 311 is drawn out, twisting of the linear material 10 will be canceled out. As described above, in one or more embodiments, the linear material 10 is stored in a manner that, when the linear material 10 is drawn out as illustrated in FIG. 1, twisting of the drawn-out linear material 10 is suppressed.

Figure 8:
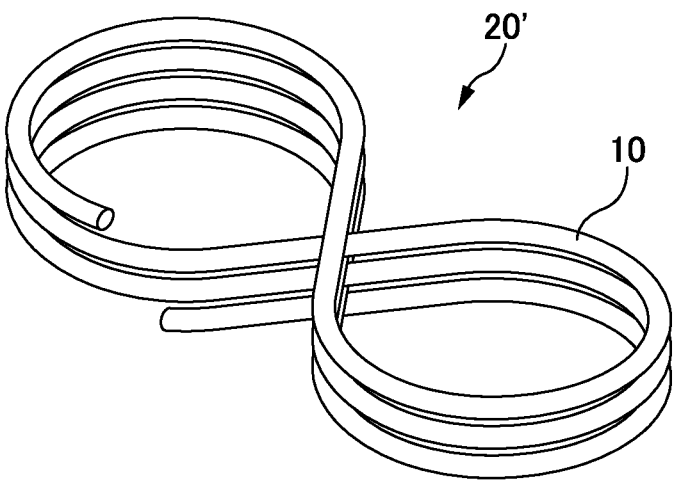
FIG. 8 is an explanatory diagram of a wound body according to a comparative example.

Another method for winding the linear material 10 capable of suppressing twisting of the linear material 10 is a winding method of winding the linear material 10 in a figure eight, as illustrated in FIG. 8. Note, however, that according to the method for winding the linear material 10 as illustrated in FIG. 8, the length of linear material 10 that can be stored within a plane perpendicular to the direction (Z direction)—in which the intersection points of the linear material 10 (the inversion parts for inverting the winding direction of the linear material 10) are stacked-becomes short. Thus, according to the winding method of the comparative example illustrated in FIG. 8, the storage volumetric efficiency of the linear material 10 is low.

In contrast, according to one or more embodiments, in the first spiral part 311 and the second spiral part 312, the linear material 10 is spirally wound in a plurality of turns (approximately 4 turns in this example). Thus, according to one or more embodiments, a greater amount of linear material 10 can be stored in the direction perpendicular to the Z direction compared to the comparative example illustrated in FIG. 8, and thus, the storage volumetric efficiency of the linear material 10 can be improved.

Figure 5A:
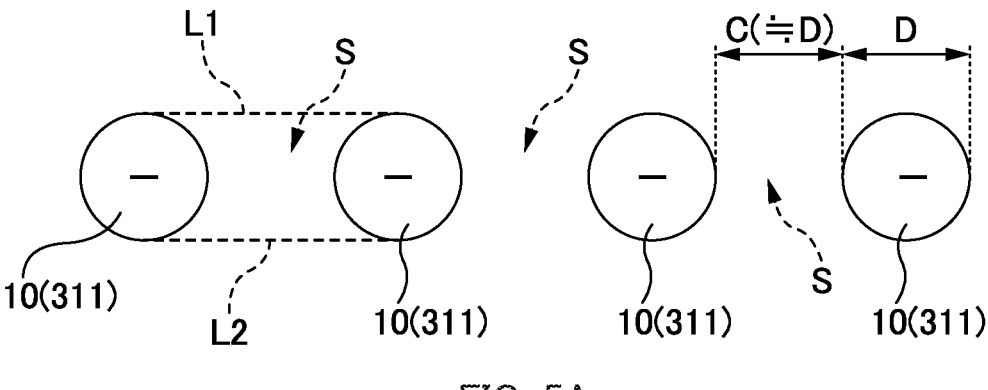
FIG. 5A is an explanatory diagram of a configuration of the linear material constituting a first spiral part within a region surrounded by the dotted lines in FIG. 2B.

FIG. 5A is an explanatory diagram of a configuration of the linear material 10 constituting the first spiral part 311 within a region surrounded by the dotted lines in FIG. 2B.

FIG. 5A illustrates a dotted line L1 that connects the upper edges of the linear material 10 constituting the first spiral part 311. FIG. 5A also illustrates a dotted line L2 that connects the lower edges of the linear material 10 constituting the first spiral part 311. As illustrated in FIG. 5A, a space S is formed between the linear material 10 constituting the first spiral part 311. The space S is a space surrounded by the side surfaces of the linear material 10 and the lines L1 and L2. FIG. 5A shows the interval (distance) C of the narrowest part of the space S in the radial direction.

The linear material 10 constituting the first spiral part 311 is spirally wound from the outer side toward the inner side in the first direction. Therefore, the space S formed by the first spiral part 311 becomes a spiral-shaped space extending from the outer side toward the inner side along the first direction. Therefore, when the space S is viewed along the second direction, the space S formed by the first spiral part 311 takes the form of a spiral-shaped space extending from the inner side toward the outer side along the second direction. So, according to one or more embodiments, the linear material 10 constituting the second spiral part 312 can be disposed along the spirally-shaped space S formed by the first spiral part 311. By disposing the linear material 10 of the second spiral part 312 along the space S formed by the first spiral part 311, in one or more embodiments, the linear material 10 constituting the first spiral part 311 (the linear material 10 indicated by the minus sign in the figure) and the linear material 10 constituting the second spiral part 312 (the linear material 10 indicated by the plus sign in the figure) are disposed alternately in the radial direction in the first layer 31, as illustrated in FIG. 2B. Further, in order to dispose the linear material 10 constituting the second spiral part 312 between the linear material 10 constituting the first spiral part 311, it is preferable that the number of turns of the linear material 10 of the first spiral part 311 is the same as the number of turns of the linear material 10 of the second spiral part 312.

In one or more embodiments, the linear material 10 constituting the second spiral part 312 is disposed in the space S (see FIG. 5A) between the linear material 10 constituting the first spiral part 311 (see FIG. 2B). As illustrated in FIG. 5A, in one or more embodiments, the interval C of the narrowest part of the space S in the radial direction is set substantially equal to the diameter D of the linear material 10, and the linear material 10 of the second spiral part 312 is disposed inside the space S, as illustrated in FIG. 2B. By disposing the linear material 10 of the second spiral part 312 within the space S formed by the first spiral part 311, unnecessary space within the wound body 20 can be reduced, and thus, storage volumetric efficiency can be improved. Note, however, that not all the parts of the linear material 10 of the second spiral part 312 have to be disposed inside the space S. It should be noted that, by disposing the linear material 10 constituting the second spiral part 312 inside the space S (see FIG. 5A) between the linear material 10 constituting the first spiral part 311, the layer constituted by the first spiral part 311 can be in the same layer as the layer constituted by the second spiral part 312. Therefore, the layer thickness (dimension in the Z direction) of the first layer 31 constituted by the first spiral part 311 and the second spiral part 312 can be reduced. Stated differently, by disposing the linear material 10 constituting the second spiral part 312 inside the space S (see FIG. 5A) between the linear material 10 constituting the first spiral part 311, the layer thickness of the first layer 31 can be made substantially equal to the layer thickness of the first spiral part 311 and the layer thickness of the second spiral part 312.

Figure 5B:
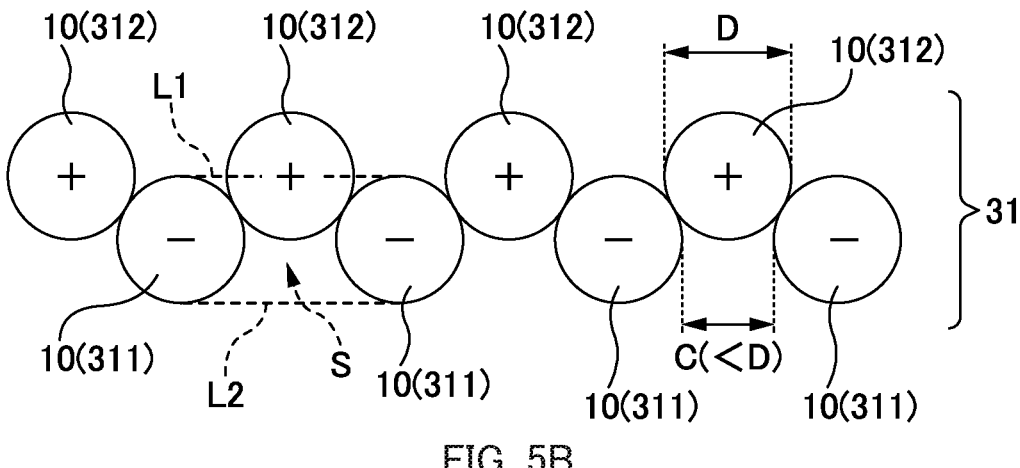
FIG. 5B is an explanatory diagram of a configuration of the linear material according to a first modified example.

FIG. 5B is an explanatory diagram of a configuration of the linear material 10 according to a first modified example. In the first modified example, the interval C of the narrowest part of the space S in the radial direction is shorter than the diameter D of the linear material 10. Therefore, in the first modified example, the entire linear material 10 of the second spiral part 312 cannot be disposed inside the space S, and only a portion of the linear material 10 of the second spiral part 312 is disposed inside the space S. However, even with the configuration of the first modified example, unnecessary space within the wound body 20 can be reduced and storage volumetric efficiency can thus be improved, compared to cases where the linear material 10 of the second spiral part 312 is not disposed in the space S at all. So, it is preferable that at least a portion of the linear material 10 constituting the second spiral part 312 is located in the space S (see FIG. 5A) between the linear material 10 constituting the first spiral part 311.

Figure 5C:
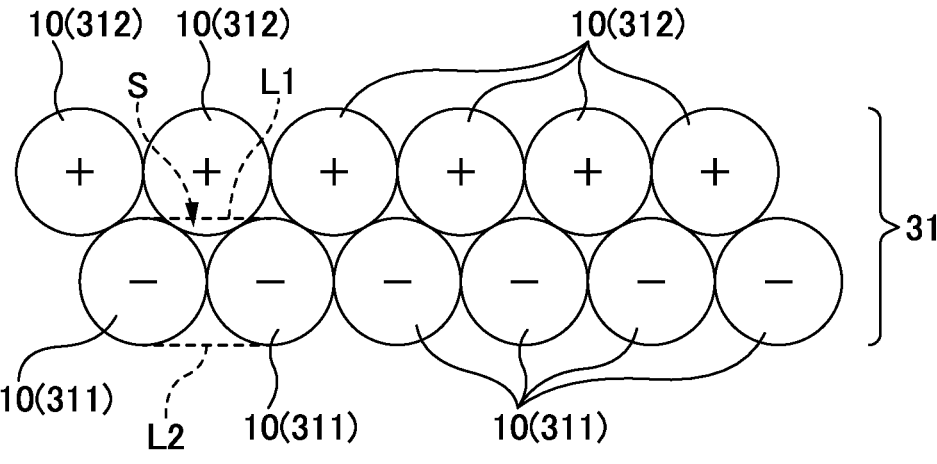
FIG. 5C is an explanatory diagram of a configuration of the linear material according to a second modified example.

FIG. 5C is an explanatory diagram of a configuration of the linear material 10 according to a second modified example. In the second modified example, the linear material 10 constituting the first spiral part 311 is mutually in contact in the radial direction. Stated differently, in the second modified example, the linear material 10 constituting the first spiral part 311 is not disposed with intervals therebetween in the radial direction (the aforementioned interval C is substantially zero). Therefore, in the second modified example, the linear material 10 of the second spiral part 312 (the linear material 10 with the plus sign in the figure) substantially cannot be disposed inside the space S. However, even with the configuration of second modified example, unnecessary space within the wound body 20 can be reduced, and thus, storage volumetric efficiency can be improved.

According to the configurations illustrated in FIGS. 2B and 5B, since the linear material 10 of the first spiral part 311 is disposed with intervals C therebetween, the number of turns in the first spiral part 311 (and the second spiral part 312) becomes smaller than that in the second modified example, and thus, at the time of drawing out the linear material 10 from the storage unit 1, twisting accumulated in the linear material 10 can be suppressed. Further, according to the configurations illustrated in FIGS. 2B and 5B, since at least a portion of the linear material 10 constituting the second spiral part 312 is located between the linear material 10 constituting the first spiral part 311, the storage volumetric efficiency is not impaired, even though the number of turns in the first spiral part 311 or the second spiral part 312 is reduced (i.e., even though there are intervals C between the linear material 10 of the first spiral part 311 (or the second spiral part 312)). Therefore, in order to both improve storage volumetric efficiency and suppress twisting accumulated in the linear material 10, it is preferable to dispose the linear material 10 constituting the first spiral part 311 (and the second spiral part 312) with intervals C therebetween and also locate at least a portion of the linear material 10 constituting the second spiral part 312 between the linear material 10 constituting the first spiral part 311.

In FIG. 2B, the position, in the Z direction, of the linear material 10 constituting the first spiral part 311 is illustrated at the same position as the position, in the Z direction, of the linear material 10 constituting the second spiral part 312. Note, however, that the first spiral part 311 and the second spiral part 312 may be slightly misaligned from one another in the Z direction. (For example, they may be misaligned in the Z direction by a distance smaller than the diameter of the linear material 10.) Further, a portion of the linear material 10 constituting the first spiral part 311 or the second spiral part 312 may be slightly misaligned in the Z direction. It should be noted that, in cases where the layer constituted by the first spiral part 311 and the layer constituted by the second spiral part 312 are misaligned in the Z direction as illustrated in FIGS. 5B and 5C, the layer thickness (the dimension in the Z direction) of the first layer 31 will increase. Therefore, it is preferable that the layer constituted by the first spiral part 311 and the layer constituted by the second spiral part 312 are located in the same layer as illustrated in FIG. 5A by locating the linear material 10 constituting the second spiral part 312 within the space S between the linear material 10 constituting the first spiral part 311.

Further, as illustrated in FIG. 2B, in one or more embodiments, the linear material 10 constituting the first spiral part 311 and the linear material 10 constituting the second spiral part 312 are in contact with one another. Particularly, in one or more embodiments, the linear material 10 constituting the second spiral part 312 (or the first spiral part 311) is in contact with the linear material 10 constituting the first spiral part 311 (or the second spiral part 312) on both sides in the radial direction. In this way, the linear material 10 can be stored with high density in the direction perpendicular to the Z direction. Note, however, that there may be a gap formed between the linear material 10 constituting the first spiral part 311 and the linear material 10 constituting the second spiral part 312.

The linear material 10 constituting the second layer 32 includes, in order from the base end side, a third spiral part 321, a second inversion part 323, and a fourth spiral part 322.

The third spiral part 321 is a part wherein the linear material 10 is spirally wound in a plurality of turns in the second direction (counterclockwise). In the third spiral part 321, the linear material 10 is wound in a manner that the distance between the linear material 10 and the center decreases as the linear material is spirally wound. In the third spiral part 321, the linear material 10 is spirally wound from the outer side toward the inner side. At an end part (end part on the base end side) on the outer side of the third spiral part 321, the linear material 10 continuously transitions from the second spiral part 312 to the third spiral part 321. At an end part (end part on the leading end side) on the inner side of the third spiral part 321, the linear material 10 continuously transitions from the third spiral part 321 to the second inversion part 323.

The second inversion part 323 is a part located inside the third spiral part 321 (and the fourth spiral part 322). In the second inversion part 323, the winding direction of the linear material 10 is inverted from the second direction (counterclockwise) to the first direction (clockwise). In this example, when the second inversion part 323 is viewed from the plus side in the Z direction, the linear material 10 is wound in an S-shape. At one end (end part on the base end side) of the second inversion part 323, the linear material 10 continuously transitions from the third spiral part 321 to the second inversion part 323. At the other end (end part on the leading end side) of the second inversion part 323, the linear material 10 continuously transitions from the second inversion part 323 to the fourth spiral part 322.

The fourth spiral part 322 is a part wherein the linear material 10 is spirally wound in a plurality of turns in the first direction (clockwise). In the fourth spiral part 322, the linear material 10 is wound in a manner that the distance between the linear material 10 and the center increases as the linear material is spirally wound. In the fourth spiral part 322, the linear material 10 is spirally wound from the inner side toward the outer side. At an end part (end part on the base end side) on the inner side of the fourth spiral part 322, the linear material 10 continuously transitions from the second inversion part 323 to the fourth spiral part 322. It should be noted that, at an end part (end part on the leading end side) on the outer side of the fourth spiral part 322, the linear material 10 continuously transitions from the fourth spiral part 322 to the first spiral part 311. Stated differently, the linear material 10 continuously transitions between the second layer 32 and the first layer 31 (i.e., the first layer 31 adjacent on the plus side in the Z direction).

When the linear material 10 of the second layer 32 is drawn out in the Z direction, the linear material 10 constituting the fourth spiral part 322 is drawn out first. In the fourth spiral part 322, the linear material 10 is wound along the second direction, and therefore, when the linear material 10 of the fourth spiral part 322 is drawn out, the drawn-out linear material 10 will be twisted in a predetermined direction. After the linear material 10 of the fourth spiral part 322 is drawn out, the linear material 10 of the second inversion part 323 and the third spiral part 321 will be drawn out. In the third spiral part 321, the linear material 10 is wound along a direction (first direction) opposite from the fourth spiral part 322, and therefore, when the linear material 10 of the third spiral part 321 is drawn out, twisting of the linear material 10 will be canceled out. It should be noted that, as described above, after the linear material 10 of the third spiral part 321 is drawn out, the linear material 10 of the first layer 31 will be drawn out.

The linear material 10 constituting the third spiral part 321 is spirally wound from the outer side toward the inner side in the second direction. Therefore, the space S formed by the third spiral part 321 becomes a spiral-shaped space extending from the outer side toward the inner side along the second direction. Therefore, when the space S is viewed along the first direction, the space S formed by the third spiral part 321 takes the form of a spiral-shaped space extending from the inner side toward the outer side along the first direction. So, similar to the first spiral part 311 and the second spiral part 312, also in the third spiral part 321 and the fourth spiral part 322, the linear material 10 constituting the fourth spiral part 322 can be disposed along the spirally-shaped space S formed by the third spiral part 321. By disposing the linear material 10 of the fourth spiral part 322 along the space S formed by the third spiral part 321, the linear material 10 constituting the third spiral part 321 (the linear material 10 indicated by the plus sign in the figure) and the linear material 10 constituting the fourth spiral part 322 (the linear material 10 indicated by the minus sign in the figure) are disposed alternately in the radial direction in the second layer 32, as illustrated in FIG. 2B. Further, in order to dispose the linear material 10 constituting the fourth spiral part 322 between the linear material 10 constituting the third spiral part 321, it is preferable that the number of turns of the linear material 10 of the third spiral part 321 is the same as the number of turns of the linear material 10 of the fourth spiral part 322.

Similar to the first spiral part 311 and the second spiral part 312, also in the third spiral part 321 and the fourth spiral part 322, the linear material 10 is spirally wound in a plurality of turns. Thus, similar to the first layer 31, also in the second layer 32, the storage volumetric efficiency of the linear material 10 can be improved, compared to the comparative example illustrated in FIG. 8. Further, also in the third spiral part 321 and the fourth spiral part 322, at least a portion of the linear material 10 constituting one of the spiral parts is located in the space S formed by the linear material 10 constituting the other spiral part. In this way, unnecessary space within the wound body 20 can be reduced, and thus, the storage volumetric efficiency of the linear material 10 can be improved. Further, similar to the first spiral part 311 and the second spiral part 312, in order to both improve storage volumetric efficiency and suppress twisting accumulated in the linear material 10, it is preferable to dispose the linear material 10 constituting the third spiral part 321 (and the fourth spiral part 322) with intervals C therebetween and also locate at least a portion of the linear material 10 constituting the fourth spiral part 322 between the linear material 10 constituting the third spiral part 321.

In FIG. 2B, the position, in the Z direction, of the linear material 10 constituting the third spiral part 321 is illustrated at the same position as the position, in the Z direction, of the linear material 10 constituting the fourth spiral part 322, but a portion of the linear material 10 constituting the third spiral part 321 or the fourth spiral part 322 may be slightly misaligned in the Z direction. Further, in one or more embodiments, the linear material 10 constituting the third spiral part 321 and the linear material 10 constituting the fourth spiral part 322 are in contact with one another, but there may be a gap formed between the linear material 10 constituting the third spiral part 321 and the linear material 10 constituting the fourth spiral part 322.

It should be noted that, instead of constituting the second layer 32 by the third spiral part 321 and the fourth spiral part 322 (and the second inversion part 323), the second layer 32 may be constituted only by the third spiral part 321 without including the fourth spiral part (and the second inversion part 323). Also with this configuration, the linear material 10 can be stored in a manner that twisting of the drawn-out linear material 10 is suppressed. Further, in cases of adopting this configuration, it is preferable to provide a layer in which the linear material 10 is wound along the opposite direction from the third spiral part 321, as a layer separate from the first layer 31 and the second layer 32. In this way, twisting that occurs when drawing out the linear material 10 of the second layer 32 (the layer constituted only by the third spiral part 321) can be canceled out by the twisting that occurs when drawing out the linear material 10 of the separate layer (the linear material 10 wound in the opposite direction from the third spiral part 321).

Further, in one or more embodiments, the first layer 31 constituted by the first spiral part 311 and the second spiral part 312 (and the first inversion part 313) and the second layer 32 constituted by the third spiral part 321 and the fourth spiral part 322 (and the second inversion part 323) are stacked. By stacking the first layer 31 and the second layer 32, it is possible to improve the storage volumetric efficiency of the linear material 10. It should be noted that, in one or more embodiments, since the winding direction of the linear material 10 is opposite from one another between the first layer 31 and the second layer 32, the linear material 10 can continuously transition between the second spiral part 312 of the first layer 31 and the third spiral part 321 of the second layer 32, and thus, the first layer 31 and the second layer 32 can be configured in a stacked manner. It should be noted that, in order to make the size of the first layer 31 and the second layer 32 the same, it is preferable that the number of turns is the same in all of the first spiral part 311, the second spiral part 312, the third spiral part 321, and the fourth spiral part 322.

Further, as illustrated in FIG. 3, in one or more embodiments, the first layer 31 and the second layer 32 are stacked alternately and repeatedly. In this way, it is possible to improve the storage volumetric efficiency of the linear material 10. It should be noted that, in one or more embodiments, since the winding direction of the linear material 10 is opposite from one another between the first layer 31 and the second layer 32, the linear material 10 can continuously transition between the second spiral part 312 of the first layer 31 and the third spiral part 321 of the second layer 32, and also the linear material 10 can continuously transition between the fourth spiral part 322 of the second layer 32 and the first spiral part 311 of the first layer 31, and thus, the first layer 31 and the second layer 32 can be stacked alternately and repeatedly.

Further, as illustrated in FIG. 2B, in one or more embodiments, the linear material 10 of the first layer 31 and the linear material 10 of the second layer 32 are in contact with one another in the Z direction (stacking direction; the up-down direction in FIG. 2B). In this way, the linear material 10 can be stored with high density in the Z direction. Note, however, that a gap may be formed in the Z direction (stacking direction; the up-down direction in FIG. 2B) between the linear material 10 of the first layer 31 and the linear material 10 of the second layer 32.

The storage body 40 is a member configured to store the linear material 10. The storage body 40 of one or more embodiments is a member configured to store the linear material 10 (wound body 20) wound as described above. In one or more embodiments, the storage body 40 has a framework structure constituted by combining a multitude of frames (rod members). Note, however, that the storage body 40 may be formed in a box structure (casing-like structure) by plate-like members etc. As illustrated in FIG. 1, the storage body 40 stores the wound body 20, with the wound body 20's plus side in the Z direction open, and is thus configured such that the linear material 10 can be drawn out in the Z direction. Note, however, that in cases where the storage body 40 is formed in a casing-like structure, a hole (opening) may be formed in the plate-like member constituting the storage body 40, and the linear material 10 may be drawn out in the Z direction through this hole.

The storage body 40 includes a base part 41 and a holding part 42. As illustrated in FIG. 2B, the base part 41 is a member configured to support the lowermost layer of the linear material 10 (wound body 20). For example, the base part 41 is constituted by a pallet. As illustrated in FIG. 1, the holding part 42 is a member configured to hold the wound linear material 10 (wound body 20). Because the holding part 42 is in contact with the linear material 10 (wound body 20), the shape of the wound body 20 can be retained. Further, because the holding part 42 holds the linear material 10 (wound body 20), the wound body 20 can be suppressed from collapsing when the linear material 10 is being drawn out, thereby making it easy to draw out the linear material 10 from the storage body 40. As illustrated in FIG. 1, in one or more embodiments, the holding part 42 is constituted by a plurality of rod members (e.g., pins) that rise up toward the plus side in the Z direction from the supporting surface of the base part 41. In this way, the holding part 42 can hold the wound body 20 while keeping the Z-direction plus side of the wound body 20 open.

Figures 6A, 6B, 6C, 6D:
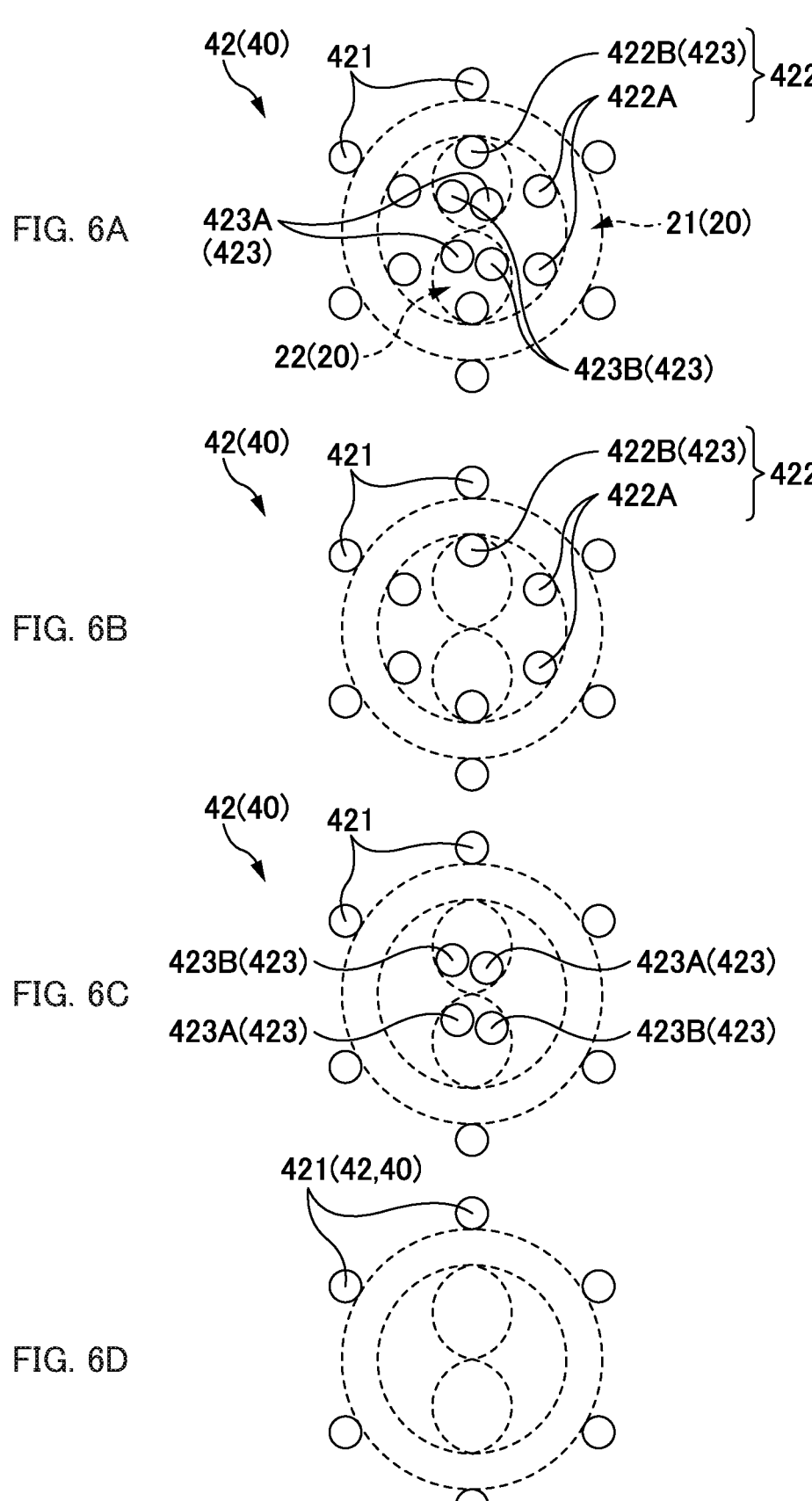
FIG. 6A is an explanatory diagram of a holding part.
FIG. 6B is an explanatory diagram of holding parts according to modified examples.
FIG. 6C is an explanatory diagram of holding parts according to modified examples.
FIG. 6D is an explanatory diagram of holding parts according to modified examples.

FIG. 6A is an explanatory diagram of the holding part 42. FIGS. 6B to 6D are explanatory diagrams of holding parts 42 according to modified examples. The holding part 42 will be described below also with reference to FIG. 1.

The holding part 42 includes an outer periphery holding part 421, an inner periphery holding part 422, and an inversion holding part 423.

The outer periphery holding part 421 is a part configured to hold the outer periphery 21A of the spirally-wound part 21 (the part constituted by the linear material 10 wound outside the inversion part 22) of the wound body 20. The outer periphery holding part 421 is a part configured to hold the outer periphery of the first spiral part 311, the second spiral part 312, the third spiral part 321, and the fourth spiral part 322. The linear material 10, which is wound along the circumferential direction, attempts to expand in the radial direction, but because the outer periphery holding part 421 comes into contact with the outer periphery 21A of the wound body 20, the shape of the wound body 20 can be retained. As described below, in cases where the linear material 10 includes a tension member 13, the force with which the linear material 10 attempts to expand in the radial direction becomes greater, and therefore, it is particularly advantageous for the holding part 42 to include the outer periphery holding part 421. In one or more embodiments, a plurality of rod members constituting the outer periphery holding part 421 are disposed substantially evenly in the circumferential direction so as to contact the outer periphery 21A of the substantially circular-cylindrical wound body 20. It should be noted that the outer periphery holding part 421 may be constituted by plate-like members. In this case, it is preferable that the inner surface of the plate-like members contacts the outer periphery 21A of the wound body 20. For example, in cases where the storage body 40 is formed in a casing-like structure by plate-like members, the inner surface of the plate-like members constituting the side surfaces of the storage body 40 may contact the outer periphery 21A of the wound body 20, and in this way, the plate-like members constituting the side surfaces of the storage body 40 may also function as the outer periphery holding part 421.

The inner periphery holding part 422 is a part configured to hold the inner periphery 21B of the spirally-wound part 21 of the wound body 20. The annular space between the inner periphery holding part 422 and the outer periphery holding part 421 (i.e., the space surrounded by the two circular dotted lines in FIG. 6A) serves as a storage part for the spirally-wound part 21 of the wound body 20. The space inside the inner periphery holding part 422 (i.e., the space surrounded by the circular dotted line on the inner side in FIG. 6A) serves as a storage part for the inversion part 22 of the wound body 20. By holding the inner periphery 21B of the wound body 20 with the inner periphery holding part 422, the linear material 10 of the spirally-wound part 21 can be suppressed from collapsing toward the inside when the linear material 10 is being drawn out. Note, however, that the holding part 42 does not have to include the inner periphery holding part 422, as illustrated in FIGS. 6C and 6D.

The inversion holding part 423 is a part configured to hold the inversion part 22 of the wound body 20. In the inversion part 22 where the winding direction of the linear material 10 is inverted, the linear material 10 is likely to become unstable and collapse. So, by holding the inversion part 22 of the wound body 20 with the inversion holding part 423, it is possible to suppress collapsing of the shape of the inversion part 22. The inversion holding part 423 includes a first inversion holding part 423A and a second inversion holding part 423B.

The first inversion holding part 423A is configured to hold a part (linear material 10), of the linear material 10 constituting the first inversion part 313, wound in the first direction and a part (linear material 10) wound in the second direction. In this way, the first inversion holding part 423A can hold the linear material 10 constituting the first inversion part 313 in its inverted S-shape (or S-shape).

The second inversion holding part 423B is configured to hold a part (linear material 10), of the linear material 10 constituting the second inversion part 323, wound in the second direction and a part (linear material 10) wound in the first direction. In this way, the second inversion holding part 423B can hold the linear material 10 constituting the second inversion part 323 in its S-shape (or inverted S-shape).

In one or more embodiments, the first inversion holding part 423A and the second inversion holding part 423B are each constituted by a plurality of rod members. The rod members constituting the first inversion holding part 423A and the second inversion holding part 423B are located in the spaces surrounded by the first inversion part 313 and the second inversion part 323. Note, however, that the first inversion holding part 423A and the second inversion holding part 423B do not have to be constituted by rod members. Further, the first inversion holding part 423A and the second inversion holding part 423B may be located outside the spaces surrounded by the first inversion part 313 and the second inversion part 323.

The inner periphery holding part 422 illustrated in FIG. 6A (and FIG. 6B) includes first inner periphery holding parts 422A and second inner periphery holding parts 422B. The first inner periphery holding parts 422A come into contact with the inner periphery 21B of the spirally-wound part 21 of the wound body 20, and are located outside the spaces surrounded by the first inversion part 313 and the second inversion part 323. The second inner periphery holding parts 422B come into contact with the inner periphery 21B of the spirally-wound part 21 of the wound body 20, and are located within the spaces surrounded by the first inversion part 313 and the second inversion part 323. In this way, the second inner periphery holding parts 422B can have both the function of holding the inner side of the spirally-wound part 21 of the wound body 20 and the function of holding the first inversion part 313 and the second inversion part 323.

It should be noted that, as illustrated in FIGS. 6B and 6D, the holding part 42 does not have to include the inversion holding part 423. In such cases, however, the linear material 10 is prone to become unstable and collapse in the inversion part 22 where the winding direction of the linear material 10 is inverted. Therefore, in cases where the holding part 42 does not include an inversion holding part 423, it is preferable to locate a portion (the second inner periphery holding part 422B) of the members constituting the inner periphery holding part 422 within the spaces surrounded by the first inversion part 313 and the second inversion part 323, as illustrated in FIG. 6B.

The holding part 42 described above includes an outer periphery holding part 421, an inner periphery holding part 422, and an inversion holding part 423. Note, however, that the holding part 42 may have other configurations, so long as the wound body 20 can be held. For example, rod members (e.g., pins) may be located between the linear material 10 of the first spiral part 311 (or the third spiral part 321) and the linear material 10 of the second spiral part 312 (or the fourth spiral part 322), to thereby retain the shape of the wound body 20 (particularly the spirally-wound part 21).

Further, the holding part 42 described above is constituted by a plurality of rod members. Note, however, that the shape of the wound body 20 may be retained by bundling the linear material 10 constituting the spirally-wound part 21 of the wound body 20 with a bundling member. In cases of constituting the holding body with a bundling member, however, there is a need to remove the bundling member at the time of drawing out the linear material 10 in the Z direction. Further, in the storage unit 1 described above, the wound body 20 formed by winding the linear material 10 is stored in the storage body 40. Note, however, that the wound body 20 does not have to be stored in a storage body 40 so long as the shape of the wound body 20 can be retained. Transportation efficiency can be improved if it is possible to ship the wound body 20 alone.

Figures 7A, 7B:
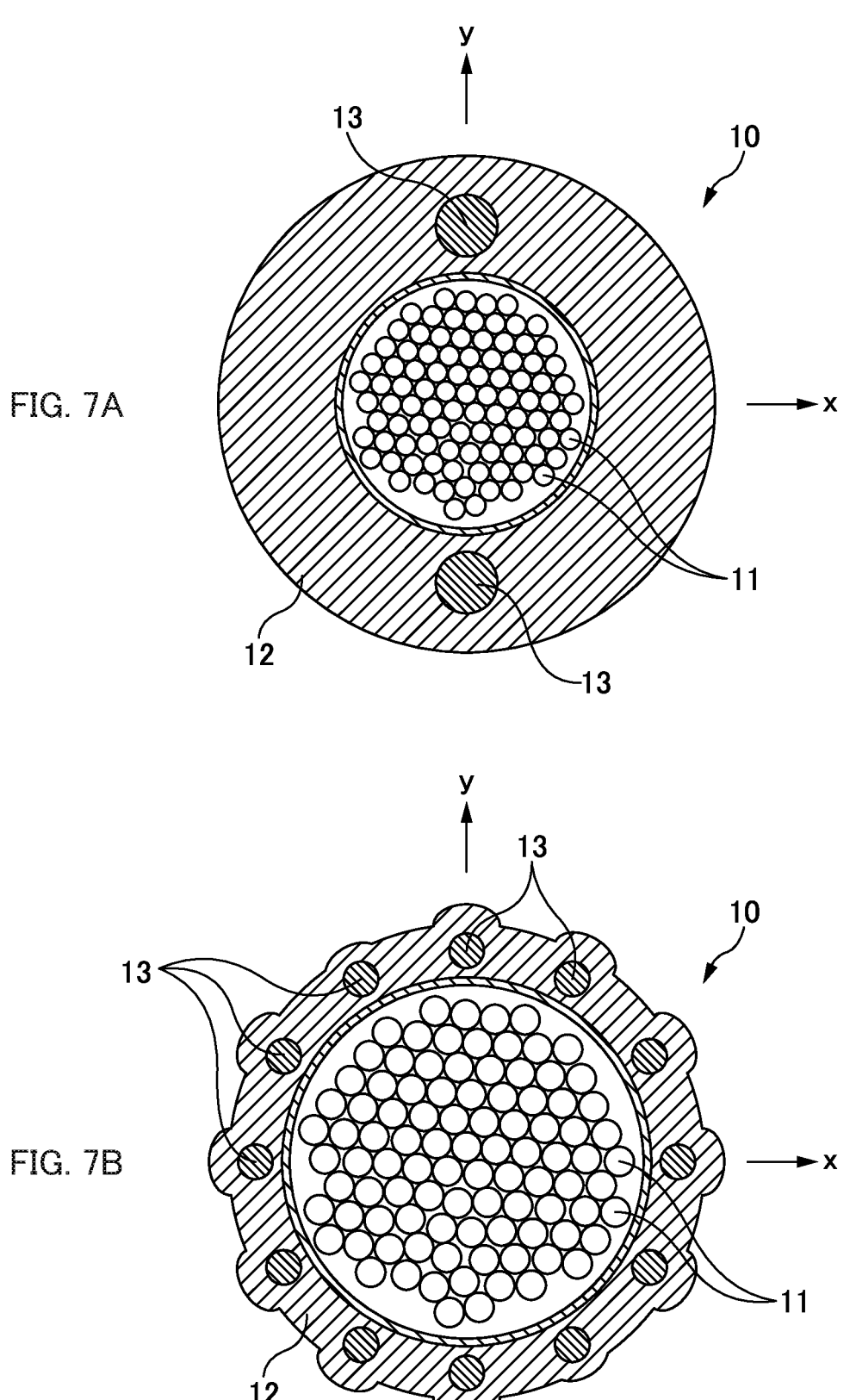
FIG. 7A is a cross-sectional view of a linear material.
FIG. 7B is a cross-sectional view of a linear material according to a modified example.

FIG. 7A is a cross-sectional view of the linear material 10. As described above, in one or more embodiments, the linear material 10 is an optical cable, and includes optical fibers 11 and an outer sheath 12 that houses the optical fibers 11. In one or more embodiments, tension members 13 are embedded in the outer sheath 12.

As illustrated in FIG. 7A, there are cases where a pair of tension members 13 is located so as to sandwich the housing part of the outer sheath 12. In the linear material 10 illustrated in FIG. 7A, the flexural rigidity differs depending on the direction in which the linear material 10 is bent. "Flexural rigidity" is the product (EI) of the second moment of area (I) of the linear material 10 and the Young's modulus (E) of the linear material 10. In cases where the linear material 10 includes tension members 13, the flexural rigidity of the linear material 10 mainly depends on the configuration of the tension members 13. For example, as illustrated in FIG. 7A, when a line connecting the respective center parts of the pair of tension members 13 is defined as the y axis and a line passing through the center of the linear material 10 and perpendicular to the y axis is defined as the x axis, the flexural rigidity about the y axis becomes smaller than the flexural rigidity about the x axis. In cases where the flexural rigidity differs depending on the direction in which the linear material 10 is bent as described above, it is preferable to wind the linear material 10 by bending the linear material 10 in the direction with a smaller flexural rigidity. In one or more embodiments, it is preferable to wind the linear material 10 such that the linear material 10 illustrated in FIG. 7A is bent about the y axis. By winding the linear material 10 in a manner that the y axis of the linear material 10 illustrated in FIG. 7A is along the Z axis illustrated in FIG. 1, it is easier to retain the shape of the wound body 20. If the linear material 10 illustrated in FIG. 7A is wound so as to be bent about the x axis, the linear material 10 is prone to collapse when the linear material 10 is drawn upward in the Z direction as illustrated in FIG. 1. Therefore, winding the linear material 10 in a manner that the linear material 10 illustrated in FIG. 7A is bent about the y axis is advantageous in that the wound body 20 can be suppressed from collapsing when the linear material 10 is being drawn out.

FIG. 7B is a cross-sectional view of a linear material 10 according to a modified example. As illustrated in FIG. 7B, the linear material 10 may be an optical cable having a uniform flexural rigidity regardless of the bending direction by disposing the tension members 13 evenly. Alternatively, the linear material 10 does not have to include a tension member 13. Alternatively, the linear material 10 does not have to be an optical cable.

Others

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Storage unit;
10: Linear material;
11: Optical fiber;
12: Outer sheath;
13: Tension member;
20: Wound body;
20A: Base end;
20B: Leading end;
21: Spirally-wound part;
21A: Outer periphery;
21B: Inner periphery;
22: Inversion part;
31: First layer;
311: First spiral part;
312: Second spiral part;
313: First inversion part;
32: Second layer;
321: Third spiral part;
322: Fourth spiral part;
323: Second inversion part;
40: Storage body;
41: Base part;
42: Holding part;
421: Outer periphery holding part;

422: Inner periphery holding part;
422A: First inner periphery holding part;
422B: Second inner periphery holding part;
423: Inversion holding part;
423A: First inversion holding part;
423B: Second inversion holding part.

The invention claimed is:

1. A storage unit comprising:
a wound body made of wound linear material; and
a storage body that stores the wound body, wherein
the wound body includes:
    a first spiral part in which the wound linear material is spirally wound in a first winding direction in a plurality of turns such that a distance between the wound linear material of the first spiral part and a center of the wound body gradually decreases with each turn, wherein the first winding direction is either clockwise or counterclockwise;
    a first inversion part, disposed inside the first spiral part, that inverts a winding direction of the wound linear material from the first winding direction to a second winding direction opposite to the first winding direction; and
    a second spiral part, disposed outside the first inversion part, in which the wound linear material is spirally wound in a plurality of turns in the second winding direction such that a distance between the wound linear material of the second spiral part and the center of the wound body gradually increases with each turn.

2. The storage unit according to claim 1, wherein at least a portion of the wound linear material of the second spiral part is disposed in a space between the wound linear material of the first spiral part.

3. The storage unit according to claim 2, wherein the wound linear material of the first spiral part is disposed with intervals in a radial direction.

4. The storage unit according to claim 2, wherein the wound linear material of the first spiral part contacts the wound linear material of the second spiral part.

5. The storage unit according to claim 1, wherein the wound body further includes:
    a third spiral part in which the wound linear material from the second spiral part is spirally wound in the second winding direction such that a distance between the wound linear material of the third spiral part and the center of the wound body gradually decreases.

6. The storage unit according to claim 5, wherein the wound body further includes:
    a second inversion part, disposed inside the third spiral part, that inverts the winding direction of the wound linear material from the second winding direction to the first winding direction; and a fourth spiral part, disposed outside the second inversion part, in which the wound linear material is spirally wound in the first winding direction such that a distance between the wound linear material of the fourth spiral part and the center of the wound body gradually increases.

7. The storage unit according to claim 6, wherein a layer including the first spiral part and the second spiral part is stacked on a layer including the third spiral part and the fourth spiral part.

8. The storage unit according to claim 7, wherein the wound linear material in the layer including the first spiral part and the second spiral part contacts the wound linear material in the layer including the third spiral part and the fourth spiral part in a stacking direction.

9. The storage unit according to claim 6, wherein layers, each including the first spiral part and the second spiral part, and layers, each including the third spiral part and the fourth spiral part, are stacked alternately and repeatedly.

10. The storage unit according to claim 6, wherein the storage body includes an outer periphery holding part that holds an outer periphery of a spirally-wound part including the wound linear material wound outside the first inversion part and the second inversion part.

11. The storage unit according to claim 10, wherein the storage body further includes an inner periphery holding part that holds an inner periphery of the spirally-wound part.

12. The storage unit according to claim 10, wherein the storage body further includes an inversion holding part that holds the first inversion part and the second inversion part.

13. The storage unit according to claim 1, wherein a flexural rigidity with respect to a neutral axis of the wound linear material is smaller than a flexural rigidity with respect to an axis orthogonal to the neutral axis.

14. A wound body comprising:
    a first spiral part in which a wound linear material is spirally wound in a first winding direction in a plurality of turns such that a distance between the wound linear material of the first spiral part and a center of the wound body gradually decreases with each turn, wherein the first direction is either clockwise or counterclockwise;
    a first inversion part, disposed inside the first spiral part, that inverts a winding direction of the wound linear material from the first winding direction to a second winding direction opposite to the first winding direction; and
    a second spiral part, disposed outside the first inversion part, in which the wound linear material is spirally wound in a plurality of turns in the second wound direction such that a distance between the wound linear material of the second spiral part and the center of the wound body gradually increases with each turn.

* * * * *